United States Patent
Hyman et al.

(10) Patent No.: US 11,134,049 B2
(45) Date of Patent: Sep. 28, 2021

(54) SYSTEMS AND METHODS FOR SENDING MESSAGES TO USERS

(71) Applicant: Braze, Inc., New York, NY (US)

(72) Inventors: Jonathan Hyman, New York, NY (US); William Magnuson, New York, NY (US); Kevin Wang, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/222,513

(22) Filed: Dec. 17, 2018

(65) Prior Publication Data
US 2020/0195600 A1 Jun. 18, 2020

(51) Int. Cl.
| G06F 15/16 | (2006.01) |
| G06F 9/54 | (2006.01) |
| H04L 29/06 | (2006.01) |
| H04L 12/58 | (2006.01) |
| H04L 29/08 | (2006.01) |
| G06F 16/953 | (2019.01) |

(52) U.S. Cl.
CPC ............ H04L 51/26 (2013.01); G06F 16/953 (2019.01); H04L 51/04 (2013.01); H04L 67/22 (2013.01)

(58) Field of Classification Search
CPC .............................. H04L 51/063; H04L 51/26
USPC ........................................................ 709/207
See application file for complete search history.

(56) References Cited

U.S. PATENT DOCUMENTS

| 6,327,611 | B1 * | 12/2001 | Everingham | G06Q 10/107 707/999.01 |
| 6,785,681 | B2 * | 8/2004 | Keskar | G06Q 10/107 |
| 7,543,243 | B2 * | 6/2009 | Schwartz | G06Q 10/107 715/711 |
| 7,908,327 | B2 * | 3/2011 | Kucharewski | G06Q 10/10 709/206 |
| 9,288,240 | B2 * | 3/2016 | Sylvain | H04L 67/306 |
| 10,367,771 | B2 * | 7/2019 | Dabney | |
| 2003/0028524 | A1 * | 2/2003 | Keskar | G06Q 10/107 |
| 2004/0135816 | A1 * | 7/2004 | Schwartz | G06Q 10/107 715/811 |
| 2004/0158609 | A1 * | 8/2004 | Daniell | H04L 51/04 709/206 |
| 2005/0198172 | A1 * | 9/2005 | Appelman | H04L 51/04 709/206 |
| 2008/0147639 | A1 * | 6/2008 | Hartman | G06F 16/24578 |
| 2008/0201435 | A1 * | 8/2008 | Dubovsky | G06Q 10/107 709/206 |
| 2016/0098460 | A1 * | 4/2016 | Lee | G06F 16/2465 707/600 |
| 2016/0132535 | A1 * | 5/2016 | Cheng | G06F 16/24552 707/747 |
| 2019/0018848 | A1 * | 1/2019 | Lee | H04L 51/04 |

\* cited by examiner

*Primary Examiner* — Hamza N Algibhah
(74) *Attorney, Agent, or Firm* — FisherBroyles, LLP

(57) ABSTRACT

Systems and methods for sending a message to a plurality of a client's users prioritize delivery of the message first to those users who are most engaged with the client. A user's degree of engagement with the client may be determined based on a variety of factors, including how recently the user interacted with the client. A database query of user contact information may result in query results being streamed to a message sending unit, and the streamed results may be ordered based on the user's degree of engagement.

17 Claims, 7 Drawing Sheets

SYSTEMS AND METHODS FOR SENDING MESSAGES TO USERS

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-app messages, or an audio recording that is sent to users via a telephony system.

Often a company will engage vendors to deliver messages to its users. The vendors may segment the recipients of those messages. In some instances, the vendors may obtain analytics on the actions taken by the users upon receipt of those messages. In most cases, the vendors have limited information about the users. At best, the vendors may have an email address, an IP address, a device identifier, and possibly a list of topics of interest to the user. Thus, the amount and degree of user information available to the vendors is typically quite limited.

When a company asks a vendor to send a message to its users, the company will provide the content of the message, and will identify which users are to receive the message. For example, a company may specify that the message is only to be delivered to users within a specific geographical area. Or the company may indicate that the message is only to be delivered to users that have expressed an interest in sports. The additional clarifying or limiting information provided by the company may also identify the location and timing of users who will receive the message.

When such a vendor receives a request to deliver a message to a company's users, the vendor will typically query a database for user contact information that can be used to send the message to the users. The response to the query is a list of user contact information that is then used to send the message to the users. However, that list will not likely be ordered in any fashion that is particularly helpful.

The users themselves who will receive the messages have different propensities to derive value from the messages. Also, different users represent varying levels of value to the company sending the messages. In existing message delivery systems, the vendors typically make no distinction between different users. The vendor simply begins sending the message to the users using the list of contact information that resulted from the database query. And as noted above, the contact information is not likely in an order that is helpful. As a result, users who have the most interest in receiving a message or who represent the highest value to the company may be among the last to receive the message. Also, the vendor may deliver the message to users who have expressed no interest in the message.

DETAILED DESCRIPTION OF PREFERRED EMBODIMENTS

Figure 1:
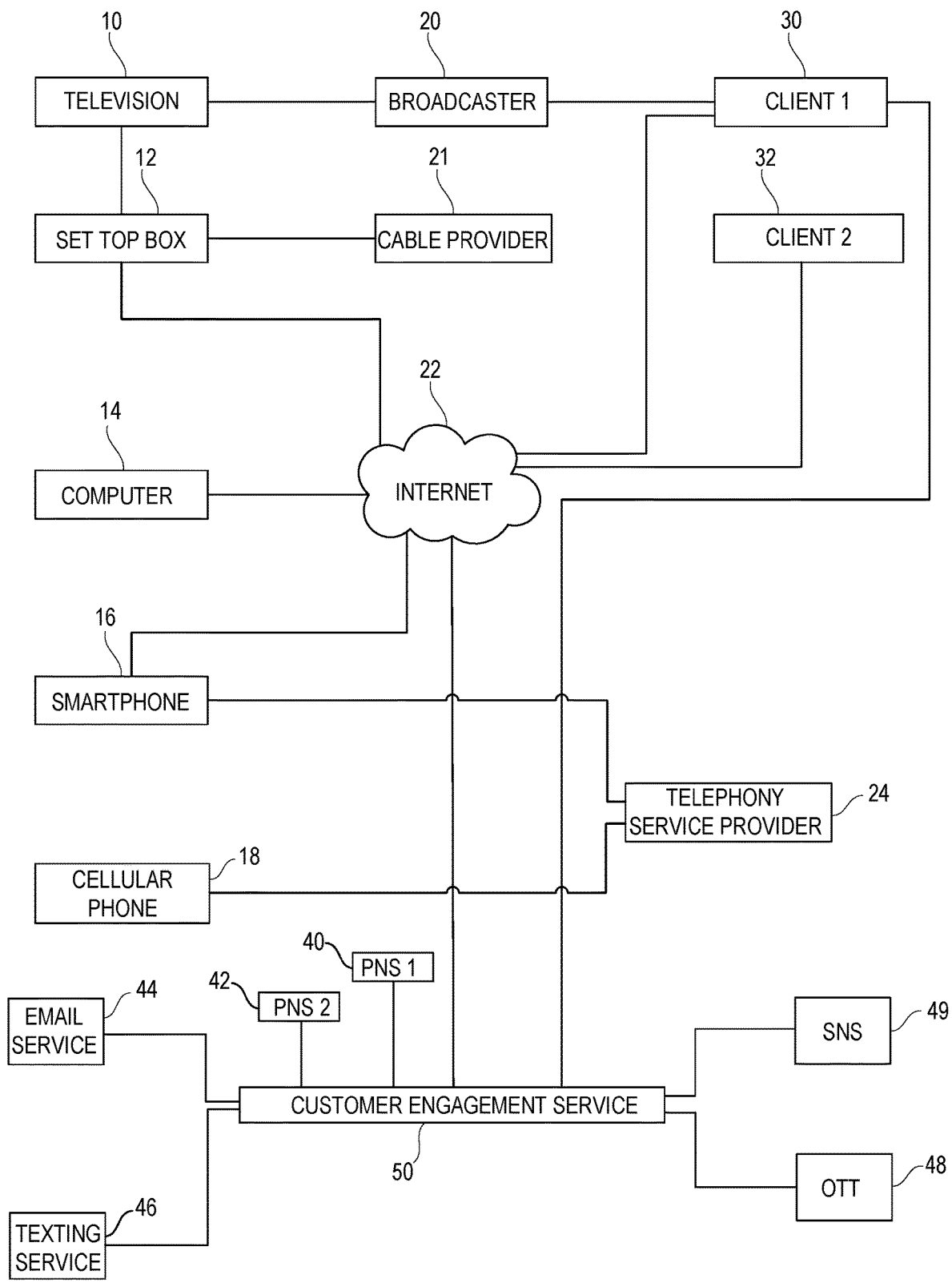
FIG. 1 is a diagram of a communications environment which could be utilized by systems and methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. The customer engagement service helps a company interact with its users to enhance the customer experience and to increase the company's business, revenue and/or stature. One of the ways that a customer engagement service assists a company is by helping the company to manage how and when messages are delivered to the company's customers. Details about how a customer engagement service operates are provided in detail below.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a software application. Often the software application is one created by the client company that wishes for the message to be sent to its users. The software application could be one that is resident on a computer, a smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

As noted above, existing message delivery services do not tend to make any distinctions between a client's users. When a client asks a traditional message delivery service to deliver a message to its users, the message delivery service will send the message in the same order in which the user's contact or delivery addresses are provided.

There are many reasons why it may be desirable to send a message first to certain users, and thereafter to other users. Systems and methods embodying the invention are designed to send a message first to certain selected users that: (1) are most likely to find the message interesting and valuable; (2) are most engaged with the client that requested the message be sent; (3) are most likely to take an action in response to receipt of the message; and/or (4) might act in a way that the client finds desirable or valuable. Of course, there may be other reasons why it is desirable to send a message first to certain selected users, and thereafter to other users. Once the message has been delivered to the selected users, the message can thereafter be delivered to other users.

Although there are many different reasons why it may be desirable to send a message first to certain selected users, and thereafter to other users, the following description uses the term "engaged" as a shorthand way to encompass any and all reasons why it would be desirable to send a message first to certain selected users. Thus, the following description and the appended claims refer to sending messages first to those users that are the most "engaged" or that are highly "engaged." The message is thereafter sent to users that are not highly engaged, that are less engaged or that are not engaged.

In some embodiments, the systems and methods disclosed and claimed in the application are designed to prioritize the way in which user contact information for the most engaged users is obtained from a database of user contact information. This makes it possible to send a message first to those users that are most engaged. The message can thereafter be sent to those users that are less engaged.

In other embodiments, the systems and methods disclosed and claimed in the application are designed to control the delivery of a message to multiple users based on various factors to help prevent a client's servers from becoming overloaded by users' actions taken in response to receipt of the message.

A customer engagement service embodying the invention is similar to a traditional message delivery service in certain limited respects. For example, a client could ask a customer engagement service to send a message to its users just as it might ask a message delivery service to send a message to its users. However, unlike a traditional message delivery service, a customer engagement service actively manages and orchestrates how the message is delivered to users. In addition, in many cases the customer engagement service does not actually send the message, as would a traditional message delivery service. Instead, the message delivery service manages the delivery of the message to users via third party message delivery services.

In addition, and for reasons that will be explained below, a customer engagement service typically has considerably more information about the users and the users' behavior than would be available to a typical message delivery service. This additional information is used to help manage, control and orchestrate the delivery of a client's message to multiple users to achieve various purposes.

FIG. 1 illustrates a communications environment in which a customer engagement service embodying the invention could exist. Before explaining the details of the customer engagement service, we will first discuss the communications environment.

As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application resident on the user's computer 14 might also be used to access media content provided by client one 30 via the Internet 22.

Yet another user may have a smartphone 16 that is capable of communicating over the Internet 22 and/or via a telephony service provider 24. A software application on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access client services and to receive messages from a client. Thus, the depiction in FIG. 1 should in no way be considered limiting.

Figure 2:
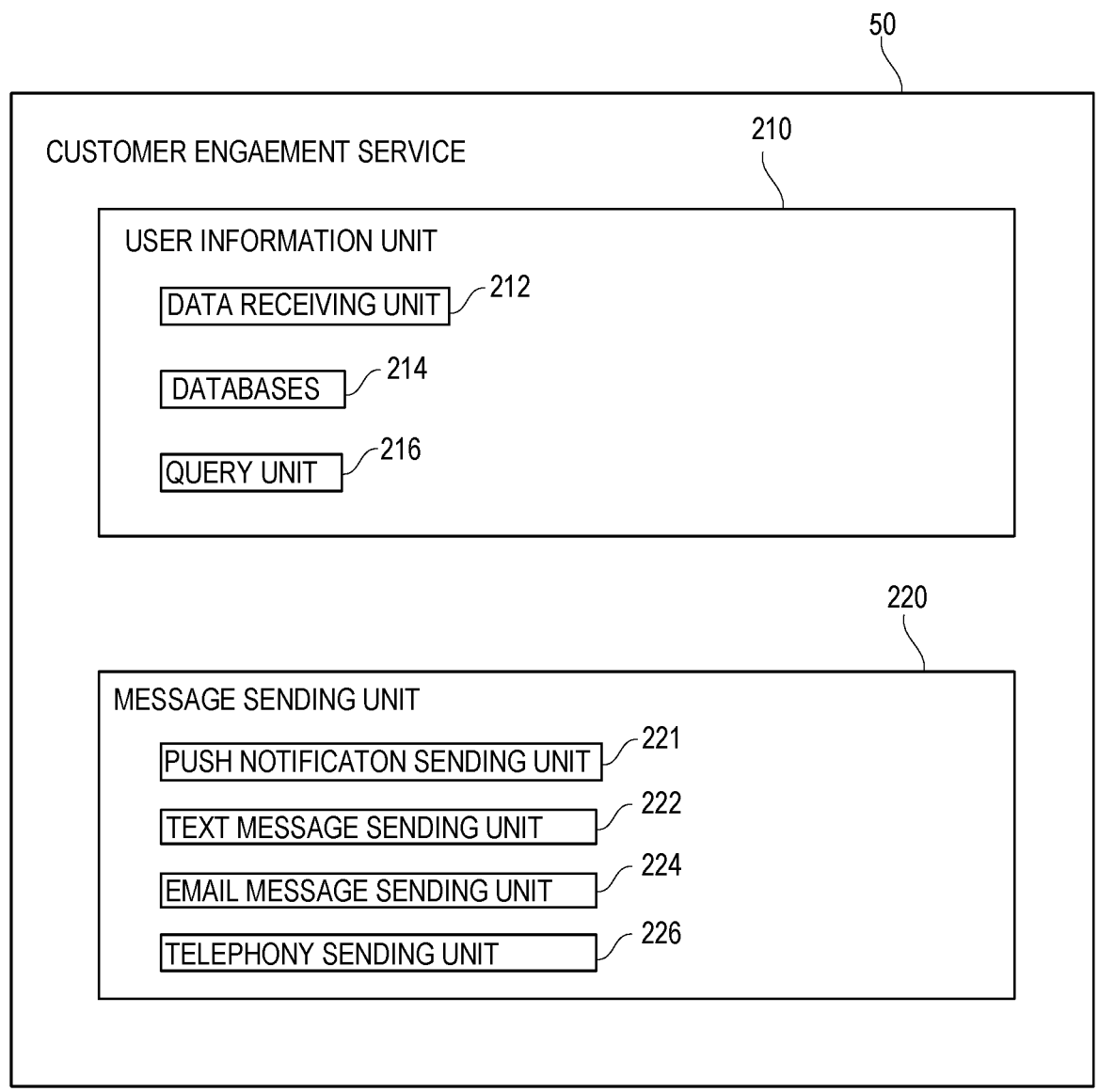
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically, a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that client to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build up a much more comprehensive and detailed picture of each user than would be possible for a typical message delivery service that is simply tasked with delivering messages to users.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users. As will be explained below, the way in which the query unit 216 operates can prioritize the delivery of messages to those users who are most engaged. The query unit 216 also can query the databases 214 in ways that improve user experiences and in ways that help to curb unnecessary or undesirable message delivery.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

Regardless of the type of message or the delivery mechanism, the message sending unit 220 could format the messages in ways specified by the client, or in ways that the customer engagement service 50 believes will be desirable or attractive to users. Also, the customer engagement service 50 might itself be responsible for delivering the message to users, or the customer engagement service 50 may utilize the services of third party to deliver the message to users, or messages may be delivered to users via a combination of the customer engagement service 50 and outside vendors.

One of the ways that the user information stored in the databases 214 can be used to a customer's advantage is to prioritize the delivery of a message first to those users that are most highly engaged. As mentioned above, what constitutes highly "engaged" may vary depending on circumstances. But essentially, users that are highly engaged are the ones that are most likely to find the message interesting or valuable, or most likely to act on the message, or they are the users that are most valuable to the client sending the message. For example, when the client is a news service, the client news service may wish to send a message to users about a breaking news event. Ideally, one would want to deliver that message first to those users who are most likely to want to hear about the breaking news event or most who eager to learn about breaking news events as soon as they occur. The message about the breaking news event could then be delivered to users who are less engaged after the message has first been delivered to the highly engaged users.

Below we discuss several techniques for prioritizing the delivery of a message to the most engaged users, and for delivering the message as rapidly as possible. In one respect, this is done using the information in the databases 214 to identify the most engaged and therefore presumably most interested users. In another respect, this is done using novel ways of querying the databases 214 that prioritize the acquisition of user contact information belonging to the most engaged users, so that the message can first be sent to those highly engaged users. In yet another respect, this can be achieved via query techniques that result in more rapid acquisition of user contact information from the databases than is possible with more traditional query techniques.

First, there must be a way of determining which users are the most engaged. This could be done in a variety of different ways. One way is to monitor how often and how recently a user has contacted a client or engaged with the client in some fashion. Those users that regularly engage with the client, or that most recently engaged with the client, are determined to be the most engaged.

In the following descriptions, we refer to "recency" or "recency" of contact. This term is used to mean how recent was a user's last contact with a client, or how recent was a user's last engagement with a client. Note, engagement with the client could mean use of a client's software application, as opposed to actual engagement with a client's website, servers, or personnel. In the following description, recency of contact or engagement is used to identify users that are the most engaged.

In the following descriptions of the methods illustrated in FIGS. 4-6, the degree of engagement of users is determined based on recency of contact or engagement with the client. Of course, in alternate methods, the degree of engagement could be determined in alternate ways. For example, assume the client is an online retailer, and the online retailer regularly sends out messages to users to announce sales or to provide discounts for limited periods of time. In this circumstance, the client engagement service 50 may track which users routinely make a purchase from the online retailer shortly after receiving such a sale/discount message. Those users would then be identified as the most engaged users.

As explained above, data about users and their contacts with a client is stored in the databases 214. That information is typically updated in real time, or near real time as soon as the information is reported to the data receiving unit 212 of the user information unit 210. Information about user contacts with a client that is stored in the databases 214 could include a timestamp indicating the last time that a user contacted or engaged with a client. For example, this timestamp could be the last time that a user accessed a website provided by the client. The timestamp could be the last time that a user used a client's software application on his smartphone to access a client's data or content. Depending on the nature of the client, the timestamp could represent different things. However, the timestamp is intended to represent the last time that a user made contact with or engaged with a client.

Information about user contacts with a client could also include information about the nature of the contact. Thus, a type of contact could be stored in the databases 214 in addition to the timestamp for that contact. Here again, the descriptions of the types of contact likely will change from client to client, depending on the nature of the client.

Moreover, data about user contacts could include a timestamp and possibly a type of contact for any number of the most recent instances that the user contacted or engaged with the client. For example, information about the last five contacts or the last 20 contacts between a user and a client could be stored in the databases 214.

When the client asks for a message to be delivered to its users, the message sending unit 220 is responsible for sending the message to those users. For purposes of this explanation, we will assume that the client asks the client engagement service 50 to send a message about a breaking news event to its users. The flowchart in FIG. 4 will be used to explain aspects of a first method 400 embodying the invention which is used to send the message to the client's users.

The method 400 begins and proceeds to step S402, where the message sending unit 220 receives information from the client regarding the desired message about the breaking news event. In step S404, the message sending unit 220, with the assistance of the query unit 216, queries the databases 214 for user contact information that can be used to deliver the message to the users. The user contact information sought from the databases 214 could vary depending on the type of message which is to be delivered, and the delivery channel for that type of message.

The query of the databases 214 will seek to obtain the user contact information that is ordered based on the recency of contact of the users with the client. As mentioned above, in this example the users' respective recency of contact with the client is being used to determine the users' respective degree of engagement. Thus, ordering the users' contact information based on recency of contact orders the users' contact information based on degree of user engagement.

The message sending unit 220 then sends the message to users in the same order in which the user contact information is extracted from the databases 214. This results in text messages first being sent to those users who have had the most recent contact with the client. Conversely, text messages will be sent last to those users who have not had recent contact with the client. As a result, users who are most engaged with the client (as determined by recency of contact) will be the first to receive a message about the breaking news event.

In addition to ordering the search results based on recency of user contact, one can configure the query of the user database 214 in other ways to help prioritize the delivery of a message to certain users, and to improve the user experience. For example, if a user has indicated to the client or to the customer engagement service that the user does not wish to receive certain messages, the query of the database can automatically eliminate that user's contact information from the query results. This satisfies the user's desire to not be sent such messages, and it prevents the message sending unit 220 from wasting time attempting to send a message to a user who does not desire the message.

User preferences about messages could be expressed in various ways. For example, where the client is a news service, a user could indicate that the user only wants to receive messages about breaking news events that relate to particular topics. In that instance, the query of the database 214 would be designed to eliminate search results for any users that do not wish to receive a message about the topic of the breaking news event. It will be apparent to those of ordinary skill in this art that a query of the user database 214 could be configured in various ways, based on the type of information present in the databases 214, to limit the returned user contact information to only those users that wish to receive the type of message being sent.

In the example provided above, the user contact information provided to the message sending unit 220 was ordered based on the users' recency of contact with the client. The type of contact that gives rise to this order may vary from client to client, depending on the nature of the client. As a result, there might be various types of recency queries, depending on the client.

For example, for a first client, it may make sense to order the user contact information simply based on the timestamp of the last contact, regardless of the type of contact. Thus, the timestamp used for ordering the output user contact information could be for the last time the user accessed the client's website, for the last time that the user opened a text message from the client, or for the last time that the user used a software application provided by the client.

For a second client, however, the ordering of the output user contact information might ignore the timestamps for instances where users opened a message from the client, and instead order the output user contact information based only on timestamps from instances where the users accessed the client's website or used a software application provided by the client to access client content. Thus, the nature of the client, and the nature of the ways in which users contact and/or interact with the client may dictate how the output user contact information is ordered in response to a recency-based query.

The above example involved a client requesting that a message be sent to its users. By querying for user contact information that is ordered based on recency of user contact with the client, one is able to send messages first to those users who appear to be most engaged with the client. When the message that is being sent to users is an email message, there are independent and additional advantages to sending email messages first to those users that are most engaged with the client.

As noted above, the email messages that are sent by the client engagement service 50 to the users may be delivered by third party email services. Such third party email services employ various tactics to prevent or eliminate the delivery of SPAM messages. For example, when a third party email service receives for delivery a large number of highly similar messages, the email service may send only a first portion of the messages to the indicated users. The email service then waits to see if those messages are ignored by the users to which they were delivered, to see if they are moved into SPAM folders, and to see if users delete the message without reading it. If those types of activities occur for a large percentage of the messages from the first block that was sent to users, the email service may decide the messages likely are SPAM, in which case the email service may refuse to deliver the remaining messages. On the other hand, if a relatively large percentage of the users to which the first block of email messages was sent open and read the message, the email service may determine that the message is legitimate, and the email service will then send the remaining messages on to the addressed users.

When the delivery of email messages to users is ordered based on the degree of engagement of the users, the email message is sent first to those users that appear to be the most engaged with the client. Presumably, those users will be more likely to open and read the email message than other users that are less engaged with the client. This activity on the part of the first users to receive the email message will signal to the email delivery service that the email message is legitimate, thereby helping to ensure that the email delivery service does not refuse to deliver the remainder of the messages based on a mistaken notion that the email message is SPAM.

The time that it takes to perform a query of the user databases 214 can impact the length of the time period that elapses before the first messages are sent to users. This becomes more problematic for a client that has a large number of users. FIG. 5 depicts steps of a second method embodying the invention that can result in messages being delivered more rapidly to the most engaged users.

The databases 214 could include fields that are true/false fields based on users' recency of contact with the client. For example, a first field for daily users is marked true if the timestamp of the last user contact is within the last 24 hours. This field is marked false if the timestamp of the last user contact is more than 24 hours ago. Similarly, a second field for weekly users is marked true if the timestamp of the user's last contact is within the last week. If the timestamp of last contact is more than a week ago, this weekly user field is marked false. Finally, a field for monthly users is marked true for those users with a timestamp of last contact that is within the last 30 days, and false if the timestamp for last contact is more than 30 days ago.

When the information stored in the databases 214 includes the true/false information for daily users, weekly users and monthly users, one can configure queries for user contact information that take this information into account. FIG. 5 depicts one such method 500.

Figure 5:
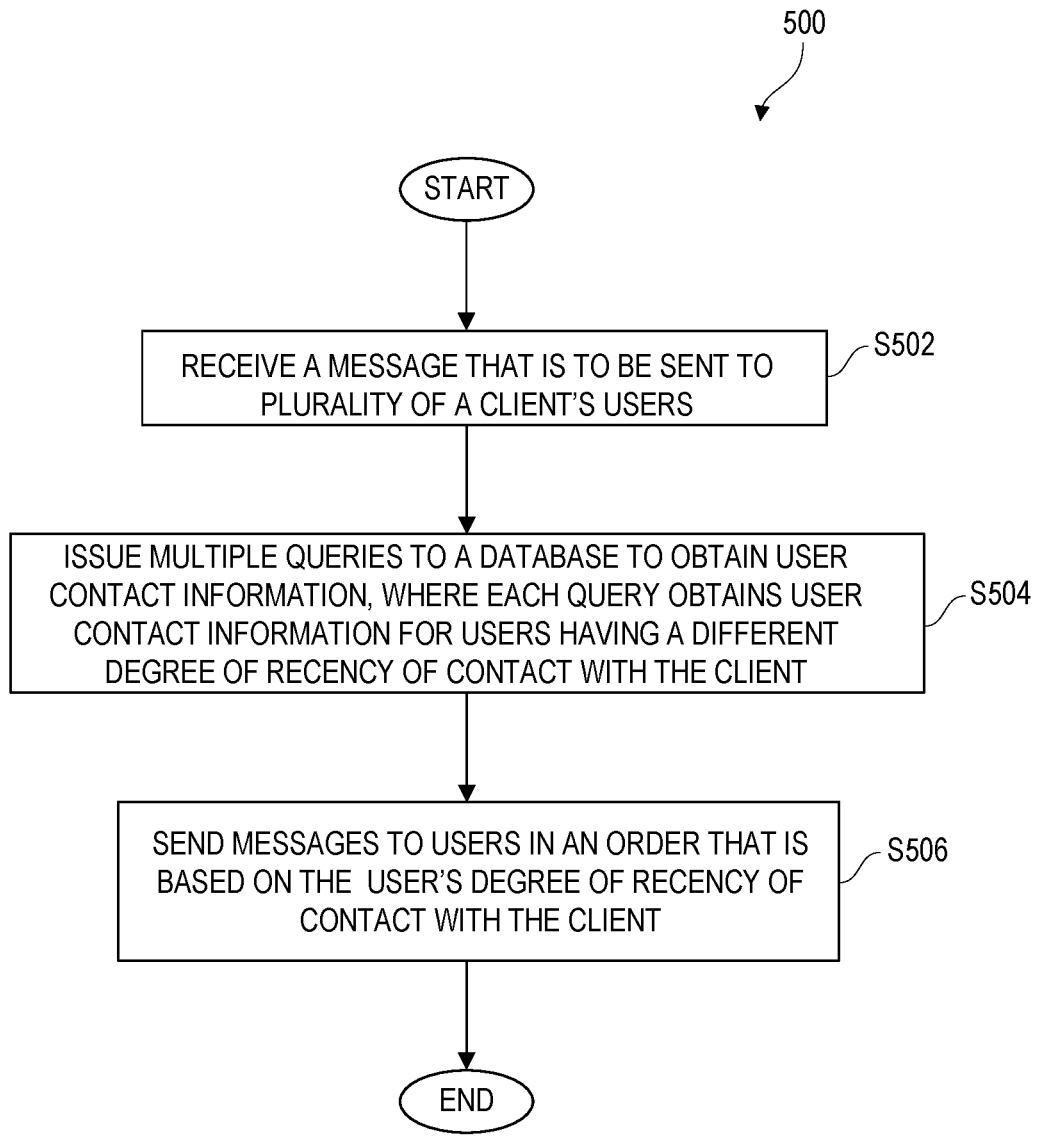
FIG. 5 is a flowchart illustrating steps of a second method embodying the invention.

As illustrated in FIG. 5, the method 500 begins and proceeds to step 502, where a message that is to be sent to a client's users is received by the message sending unit 220. In step S504, multiple queries are performed simultaneously to obtain user contact information from the databases 214. The first query only seeks user contact information for users that have a daily user field that is true. A second query asks for user contact information for those users that have a weekly contact field that is marked true. A third query asks for user contact information for users that have a monthly contact field that is marked true. A fourth query could seek user contact information for users that have all three of the daily user, weekly user and monthly user fields marked as false.

Because the individual queries can utilize indexes that are based on the daily, weekly and monthly user fields, each query will be faster to perform than a single query that looks at all the user information in the databases 214. Further, the user contact information that is produced in response to each query could still be ordered based on recency of contact.

The message sending unit 220 could then send messages first to the daily users whose contact information was returned by the first query. The daily users are likely to be the smallest group of users, so the search results from the first query are also likely to be available the fastest. This means that messages sent to the daily users will very rapidly be delivered to the daily users—more rapidly than if the query results were from a single query of all users.

Messages could be sent to weekly users using user contact information returned by the second query only after all messages are sent to daily users. Alternatively, a separate message delivery process could be initiated in parallel to send messages to the weekly users. Similarly, messages could be sent to monthly users identified by the third query and to those users identified by the fourth query only after messages are sent to the users identified by the first and second queries. Or, separate message delivery processes could be initiated for users identified by each of the queries as the query results become available.

Several other query techniques can also be used to speed up the delivery of messages to users, and in particular, to the most engaged users. One such query technique relates to how query results are returned to the message sending unit 220.

In known techniques for querying a database for user contact information, the query requests contact information for all users that satisfy designated criteria. The query is used to compile a list of user contact information for users that satisfy the criteria, and the list is then provided to a message sending unit. Once the message sending unit receives that list, it can begin sending messages using the returned user contact information.

In some embodiments of the invention, however, rather than compiling a list of user contact information for all users that satisfy designated criteria, and then providing that list to a message sending unit 220, the search results are streamed to the message sending unit 220 as soon as they are identified in the database. If the database has been indexed based on users' recency of contact with the client, this means that user contact information for users with the most recent contact with the client immediately begins streaming to the message sending unit 220 as soon as the query begins. This, in turn, means that the message sending unit 220 can begin sending messages to the users with the most recent contact with the client while the query is still being performed on the database.

Operating a query so that it streams results to a message sending unit 220 can significantly decrease the delay between the time at which a message sending unit 220 receives a message from a client for delivery to users, and the time when the first messages are sent to users. In the case of a news service client, this means that the message sending unit 220 can begin sending the message about the breaking news item to users more rapidly than if the query results are not streamed to the message sending unit 220. Moreover, if the streamed query results are ordered based on recency of user contact with the client, this ensures that messages are delivered first to those users that are most engaged with the client. This technique could be used in connection with the methods described above in connection with FIGS. 4 and 5, and in connection with another method that will be discussed below in connection with FIG. 6.

Another method embodying the invention that utilizes yet another query technique to further decrease the delay between the time at which a message sending unit 220 receives a message from a client for delivery to users, and the time when the first messages are sent to users will now be described with references to FIGS. 3 and 6. In this method, the query of the database 214 is performed in such a way that the users with the most recent contact with the client are identified even more rapidly, meaning messages can be sent to those users more quickly.

Figure 3:
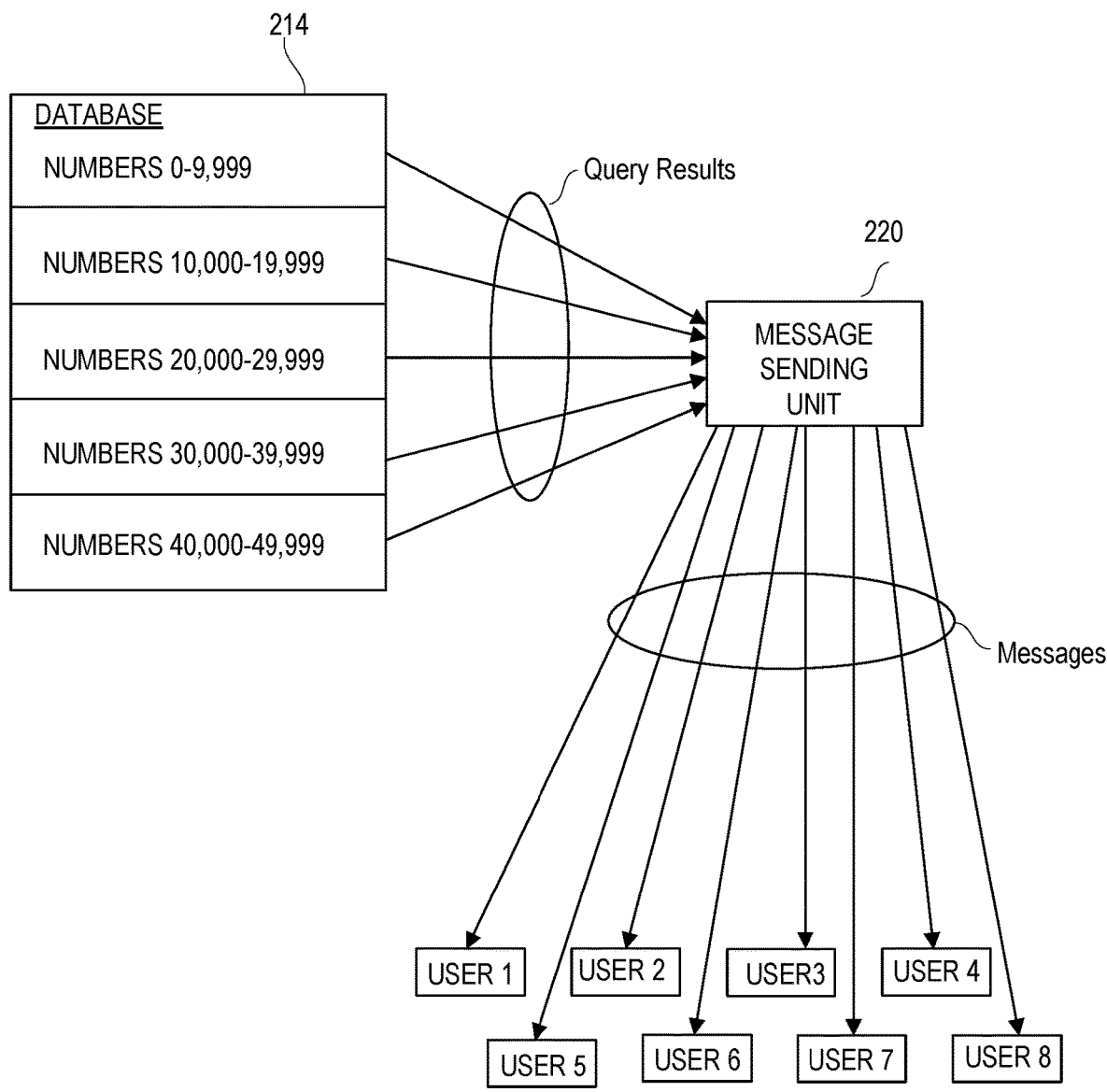
FIG. 3 is a diagram that is used to help explain how a database of user information can be queried in a way that increases the speed at which a message can be sent to a client's users.

FIG. 3 is a diagram that is intended to help illustrate this method. The database of user information 214 includes a number field for each user, and the number field contains a randomly assigned number having a value between 0 and 49,999. The numbers in this field could be randomly assigned when each record is created. Alternatively, the numbers could be randomly assigned, or re-assigned, after the records are created.

If the numbers are randomly assigned, one would expect 20% of the records to receive a number between 0 and 9,999. Likewise, one would expect 20% of the records to have a number between 10,000 and 19,999, 20% of the records to have a number between 20,000 and 29,999, 20% of the records to have a number between 30,000 and 39,999, and for 20% of the records to have a number of between 40,000 and 49,999. FIG. 3 illustrates this point by showing the database segmented into five sections, based upon the random numbers in the number field of the records.

When the message sending unit 220 receives a message from a client that is to be sent to the client's users, the message sending unit 220 asks the query unit 216 to perform five separate streaming result queries on the database 214, and asks for the results of each individual query to be ordered based on recency of user contact with the client. Each of the five queries only seeks user contact information for users having a number within a portion of the range of 0-49,999. Specifically, the first query only seeks user contact information for users with a number field value of between 0 and 9,999. The second query only seeks user contact information for users with a number field value of between 10,000 and 19,999, and so forth.

If the database is indexed based on the value in the number field and based on recency of contact, the first query will only need to review 20% of total records in the database 214, which have a number field value of between 0 and 9,999. Similarly, the second, third, fourth and fifth queries also will only need to review 20% of the total number of records in the database. The results from all five of the queries will immediately begin streaming to the message sending unit 220, which can begin sending messages to the users as soon as the query search results begin arriving. Because the search results from all five queries will be ordered based on recency of user contact with the client, this allows the overall process to identify the users with the most recent contact with the client up to five times faster than a single query where the results are ordered based on recency of contact.

Figure 6:
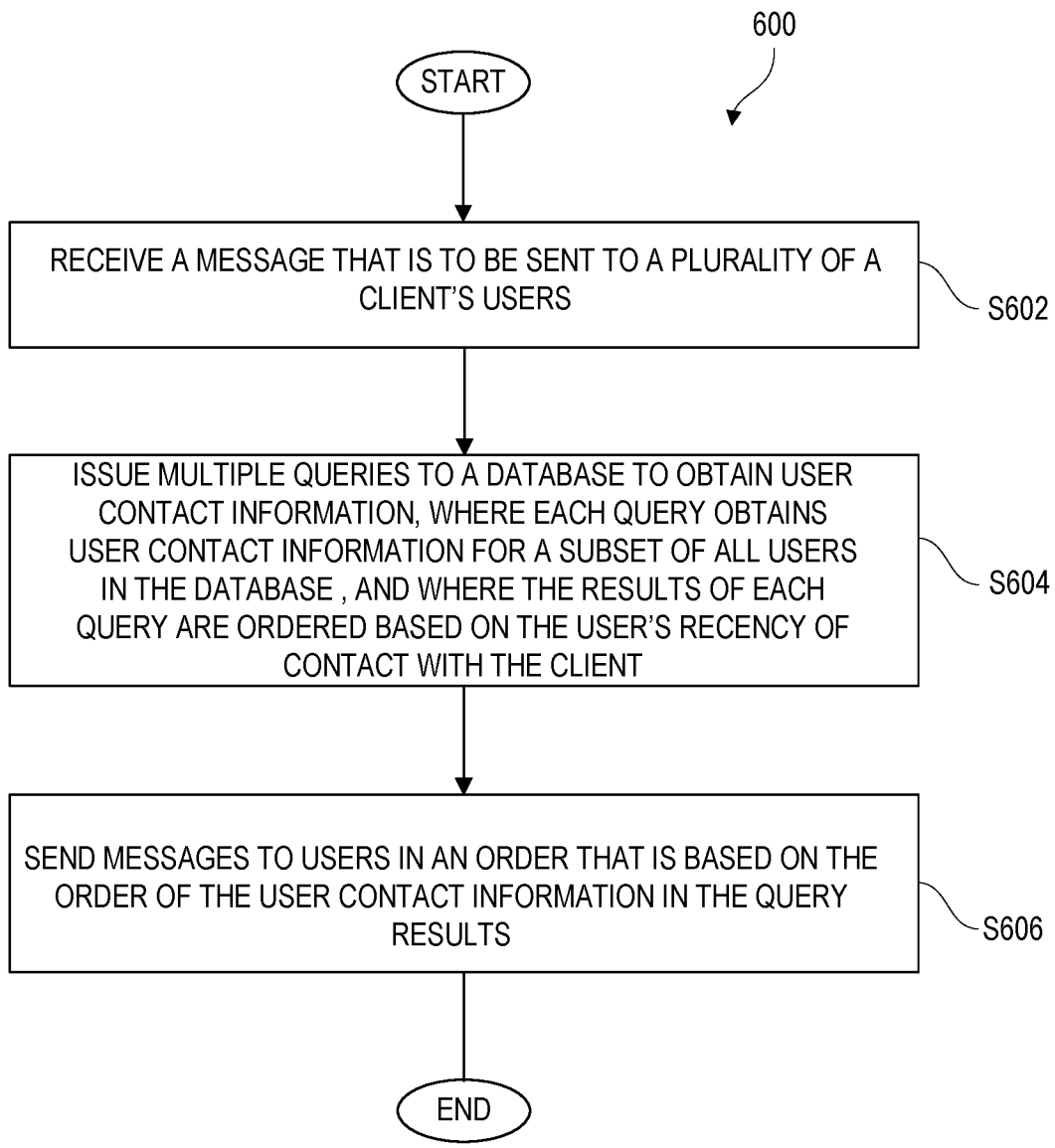
FIG. 6 is a flowchart illustrating steps of a third method embodying the invention.

FIG. 6 illustrates steps of a method 600 that operates as described above. The method 600 begins and proceeds to step S602 where a message that is to be sent to a client's users is received by a message sending unit 220. In step S604, a query unit 216 issues multiple simultaneous queries to a database 214 to obtain user contact information. Each query seeks to obtain user contact information for a subset of all users in the database 214. As explained above, this can be accomplished by configuring each query to seek data from only records having a randomly assigned number field value that represents a subset of the entire range of the number field values. In addition, each of the queries seeks user contact information that is ordered based on the users' recency of contact with the client. As also mentioned above, each of the queries could be configured to stream results to the message sending unit 220.

In step S606, the message sending unit 220 uses the search results from the multiple queries to send messages to the users. Because the search results of the queries are ordered based on recency of user contact, the messages are sent to users in an order that is based on recency of contact. The method then ends.

In the above example, the randomly assigned numbers were used to break up a single query into five separate queries that could be performed in parallel to speed up the generation of query results. In alternate methods, there could be more than five simultaneous queries, to further speed up the generation of search results, or there could be fewer simultaneous queries.

In the above examples, one was attempting to send messages to the most highly engaged users as rapidly as possible. User engagement was identified based on the recency of user contact with the client. That recency of contact could include users that most recently used a client's software application, users that most recently opened a message from the client, users that most recently accessed a client's website, users that most recently made a purchase from a client, and users that accessed a client's media content via a cable or Internet connected television set top box. As should be apparent, recency could be determined in various ways depending on the client.

As mentioned above, user engagement may be based on other factors beyond recency of contact. Thus, the examples given above, where degree of engagement is determined based on recency, should in no way be considered limiting.

For example, if a client wished to extend a special sale offer to a limited number of its users, it would make sense to send that special offer to users who have actually made purchases in the past, as opposed to simply those with the most recent contacts. Thus, alternate ways of determining a degree of user engagement may be even more important, depending on the type of message that is being sent, and depending on the nature of the client.

Other ways of determining the degree of user engagement could be based on how often a user opens and views push notifications, and/or how often a user selects links in email messages. Any sort of user conversion event, such as a purchase from an online retailer, may also be used to gauge user engagement. For example, if the goal of a message sent to users was to cause the user to invite a friend to join, the users who actually sent an invitation to friends could be determined to be more highly engaged.

Another way of determining engagement is to view the users' respective value to the client. With that in mind, degree of engagement might be based on the overall lifetime purchase value of a user or the overall total number of webpage views or login sessions. Thus, degree of user engagement may be based on long term metrics that accumulate over time, and/or which are indicative of a value of the user to the client.

User's level or degree of engagement might also be defined by the client for whom messages are being sent. For example, the client could specify that one should consider females who have been using a client's services for more than three years and who live in a certain geographical area and who have more than a predetermined level of income as the most engaged users. Messages could then be delivered first to that defined group of users using the same techniques discussed above to prioritize the acquisition and use of contact information for that defined group of users.

Machine learning might also be used to determine the degree of user engagement with a client. For example, one could send a variety of different types of messages to users, and then watch how the users respond to the message. Machine learning may be able to identify a particular combination of user characteristics and/or user behavior that tend to point to the most engaged users. Thus, machine learning based on training data sets may be an effective way to determine a customer engagement score.

In the foregoing examples, information about the most engaged users was used to prioritize the delivery of messages to those users that are determined to be the most engaged. However, in some instances this information could be used in other ways to control how a client's message is delivered to users. For example, if we expect a particular message to cause many users to immediately engage with the client, such as by logging onto the client's website or by opening a software application provided by the client, then we may wish to deliberately slow the delivery of the message to the most engaged users to help prevent the expected user engagement with the client from overloading the client's servers and support systems. Thus, information about user engagement might be used to deliberately slow or stagger the delivery of certain types of messages.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 7:
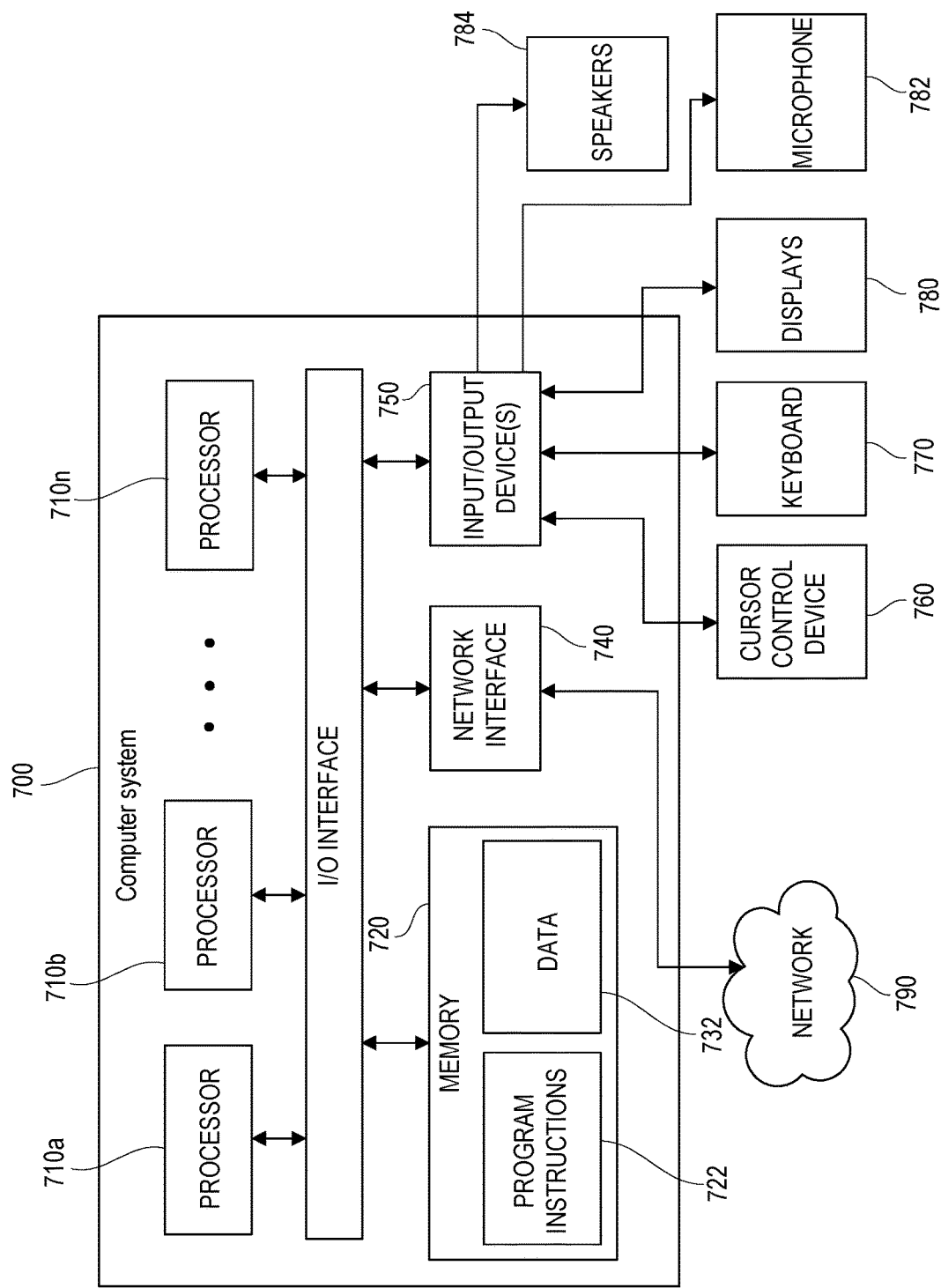
FIG. 7 is a diagram of a computer system and associated peripherals which could embody the invention, or which could be used to practice methods embodying the invention.

FIG. 7 depicts a computer system 700 that can be utilized in various embodiments of the present invention to implement the invention according to one or more embodiments. The various embodiments as described herein may be executed on one or more computer systems, which may interact with various other devices. One such computer system is the computer system 700 illustrated in FIG. 7. The computer system 700 may be configured to implement the methods described above. The computer system 700 may be used to implement any other system, device, element, functionality or method of the above-described embodiments. In the illustrated embodiments, the computer system 700 may be configured to implement the disclosed methods as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, display(s) 780, microphone 782 and speakers 784. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, the computer system 700 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 4:
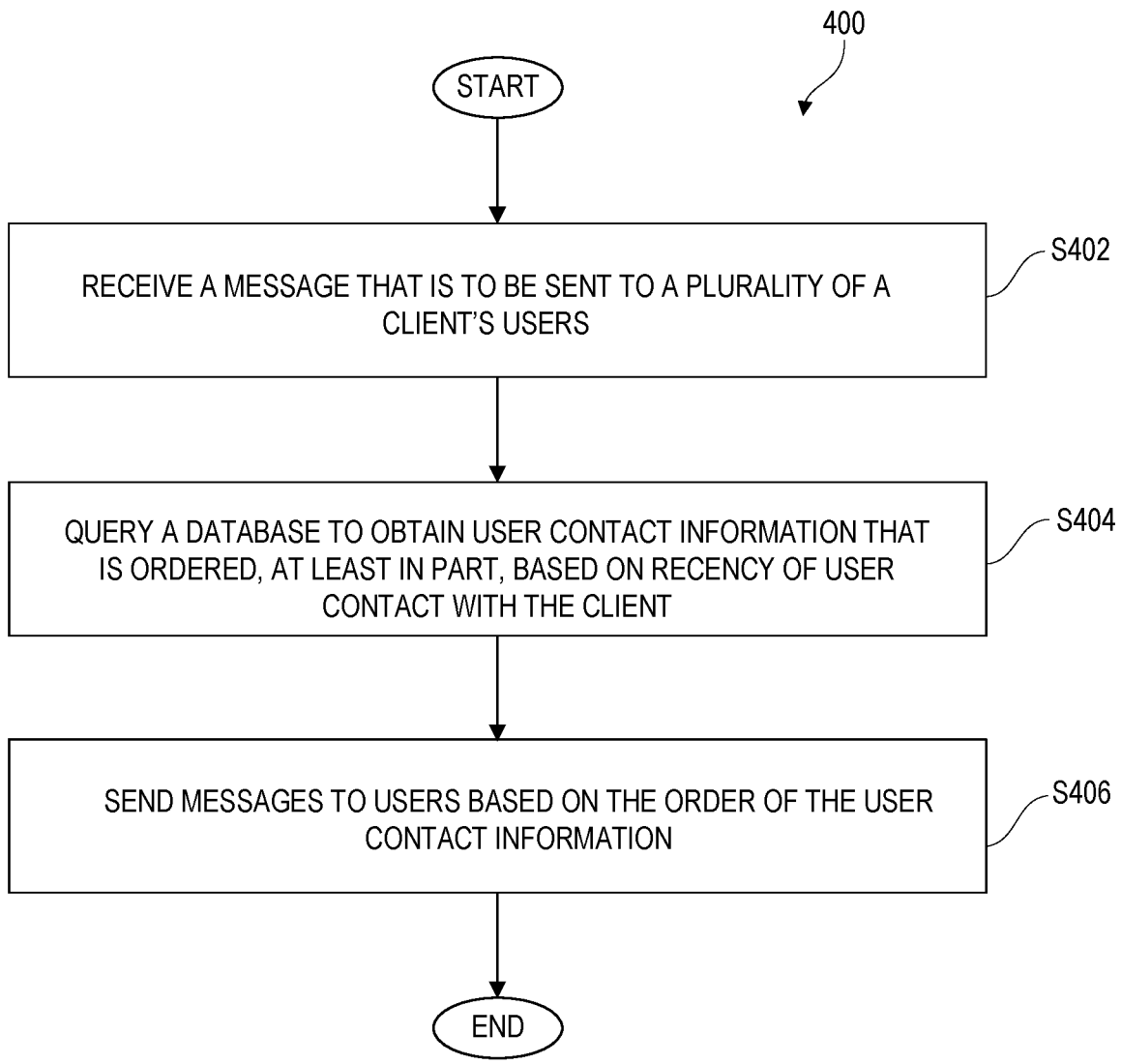
FIG. 4 is a flowchart illustrating steps of a first method embodying the invention.

In some embodiments, the illustrated computer system may implement any of the operations and methods described above, such as the methods illustrated by the flowcharts of FIGS. 4-6. In other embodiments, different elements and data may be included.

Those skilled in the art will appreciate that the computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer implemented method, performed by elements of a customer engagement service that manages the delivery and timing of messaging that a client of the customer engagement service sends to its users, the method comprising:
   receiving, at the customer engagement service, a message that a client of the customer engagement service would like to have sent to a plurality of the client's users;
   querying a database of the client's users to obtain contact information for users that can be used to send the message to the users, wherein the query results in contact information for individual users being streamed to a messaging sending unit of the customer engagement service, wherein the user contact information in the stream is ordered, at least in part, based on the users' level of engagement with the client, and wherein the users' level of engagement with the client is based on a recency of contact that the users had with the client; and
   sending the message from the customer engagement service to individual ones of the client's users based on the order in which the user's contact information appears in the query results.

2. The method of claim 1, wherein sending the message comprises sending the message first to the users who have had the most recent contact with the client.

3. The method of claim 1, where the database includes information that represents the users' level of engagement with the client.

4. The method of claim 3, wherein the information in the database that represents the users' level of engagement with the client includes, for each user, a timestamp for when the user last had contact with the client or last engaged with the client.

5. The method of claim 4, wherein the timestamp is for the last time that a user opened or used a software application provided by the client.

6. The method of claim 4, wherein the timestamp is for the last time that a user acted to view a message sent to the user that relates to the client.

7. The method of claim 1, wherein information in the database allows the database to be divided into a plurality of approximately equal sized sections of user records, and wherein querying the database comprises issuing a plurality of queries to obtain user contact information, where each of the queries only searches user records in one of the plurality of sections.

8. The method of claim 7, wherein each of the plurality of queries results in contact information for individual users in one of the plurality of sections being streamed to a messaging sending unit of the customer engagement service, and wherein the user contact information in each of the streams is ordered based on the users' level of engagement with the client.

9. A system comprising part of a customer engagement service that manages the delivery and timing of messaging that a client of the customer engagement service sends to its users, comprising:

means for receiving, at the customer engagement service, a message that a client of the customer engagement service would like to have sent to a plurality of the client's users;

means for querying a database of the client's users to obtain contact information for users that can be used to send the message to the users, wherein the query results in contact information for individual users being streamed to a messaging sending unit of the customer engagement service, wherein the user contact information in the stream is ordered, at least in part, based on the users' level of engagement with the client, and wherein the users' level of engagement with the client is based on a recency of contact that the users had with the client; and means for sending the message from the customer engagement service to individual ones of the client's users based on the order in which the user's contact information appears in the query results.

10. A system which is part of a customer engagement service that manages the delivery and timing of messaging that a client of the customer engagement service sends to its users, comprising:

a message sending unit that is part of the customer engagement service and that is configured to receive a message from a client of the customer engagement service that the client would like to have sent to a plurality of the client's users; and a query unit that is part of the customer engagement service and that is configured to query a database of the client's users to obtain contact information for users that can be used to send the message to the users, wherein the query results in contact information for individual users being streamed to the messaging sending unit of the customer engagement service, wherein the user contact information in the stream is ordered, at least in part, based on the users' level of engagement with the client, and wherein the users' level of engagement with the client is based on a recency of contact that the users had with the client;

wherein the message sending unit sends the message to individual ones of the client's users based on the order in which the user's contact information appears in the query results.

11. The system of claim 10, wherein the message sending unit sends the message first to the users who have had the most recent contact with the client.

12. The system of claim 10, where the database includes information that represents the users' level of engagement with the client.

13. The system of claim 12, wherein the information in the database that re presents the users' level of engagement with the client includes, for each user, a timestamp for when the user last had contact with the client or last engaged with the client.

14. The system of claim 13, wherein the timestamp is for the last time that a user opened or used a software application provided by the client.

15. The system of claim 13, wherein the timestamp is for the last time that a user acted to view a message sent to the user that relates to the client.

16. The system of claim 10, wherein information in the database allows the database to be divided into a plurality of approximately equal sized sections of user records, and wherein the query unit issues a plurality of queries to obtain user contact information, where each of the queries only searches user records in one of the plurality of sections.

17. The system of claim 16, wherein each of the plurality of queries results in contact information for individual users in one of the plurality of sections being streamed to the messaging sending unit, and wherein the user contact information in each of the streams is ordered based on the users' level of engagement with the client.

* * * * *